United States Patent
Fujita et al.

(10) Patent No.: US 6,687,300 B1
(45) Date of Patent: *Feb. 3, 2004

(54) MOTION DETECTION CIRCUIT AND A NOISE SUPPRESSING CIRCUIT INCLUDING THE SAME

(75) Inventors: Yukio Fujita, Kakegawa (JP); Noriyoshi Kato, Hamamatsu (JP); Misa Kasahara, Yokohama (JP)

(73) Assignee: Matsushita Electic Industrial Co., Inc., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/394,685

(22) Filed: Sep. 13, 1999

(30) Foreign Application Priority Data

Sep. 29, 1998 (JP) ............................................ 10-276253

(51) Int. Cl.[7] ................................................. H04N 7/12
(52) U.S. Cl. .................. 375/240.16; 382/266; 348/620; 348/625
(58) Field of Search ................................. 348/700, 452, 348/699, 451, 409.1, 620, 701, 607; 375/240.02, 240.16, 240.12; 382/236, 263, 264, 268, 266–267

(56) References Cited

U.S. PATENT DOCUMENTS

| | | | |
|---|---|---|---|
| 4,884,136 A | * 11/1989 | Ninomiya et al. | 348/701 |
| 5,497,203 A | * 3/1996 | Kayashima et al. | 348/699 |
| 5,528,313 A | * 6/1996 | Tanaka et al. | 348/699 |
| 5,539,469 A | * 7/1996 | Jung | 375/240.14 |
| 5,600,737 A | 2/1997 | Murakami et al. | |
| 5,602,591 A | * 2/1997 | Saiki | 348/699 |
| 6,008,866 A | * 12/1999 | Komatsu | 375/240.2 |
| 6,061,100 A | * 5/2000 | Ward et al. | 348/700 |

FOREIGN PATENT DOCUMENTS

| | | |
|---|---|---|
| EP | 0310032 | 4/1989 |
| EP | 0502615 | 9/1992 |
| EP | 0777388 | 6/1997 |
| JP | 7-131676 | 5/1995 |
| JP | 9-81754 | 3/1997 |

OTHER PUBLICATIONS

Nogaki S. et al.: "A Study on HDTV signal coding with motion adaptive noise reduction".

* cited by examiner

*Primary Examiner*—Gims S. Philippe
(74) *Attorney, Agent, or Firm*—Louis Woo

(57) ABSTRACT

In a motion detection circuit, a difference signal between the video and one-frame delayed video signals is generated Edge signals are generated from the video and delayed video signals. Motion in a target pixel is judged from the interframe difference signal according to the edge signals. A motion judging circuit further includes an LPF and a selector for supplying an output of the LPF or the difference signal. The motion judging circuit includes a polarity deviation detecting circuit for judging the motion as moving in the presence of agreement of the polarities of all pixels at any of peripheral areas around the target pixel. The size of the peripheral areas are controlled. The motion judging circuit may further includes a peripheral pixel comparing circuit (may be bypassed) for detecting motion at the pixel by checking polarities of the difference signal at an area around the target pixel and a majority detection circuit (may be bypassed) for detecting a majority of the results of the polarity deviation detection circuit to judge the motion with deviation to a side of stopping. The polarity deviation circuit may compensate the result of the peripheral pixel comparing circuit. Width of the edge signals are controlled. A noise suppression apparatus including a motion detection circuit mentioned above is also disclosed.

35 Claims, 8 Drawing Sheets

TARGET PIXEL TP

PREDETERMINED AREA

TARGET PIXEL TP

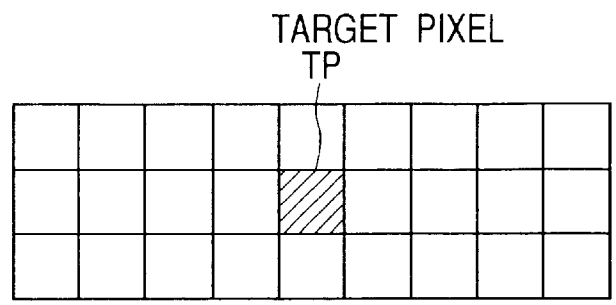
FIG. 4A
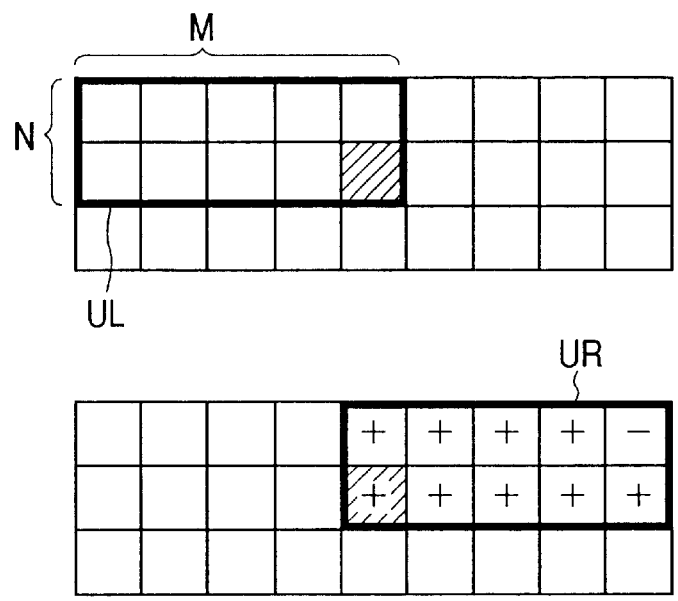
FIG. 4B
FIG. 4C
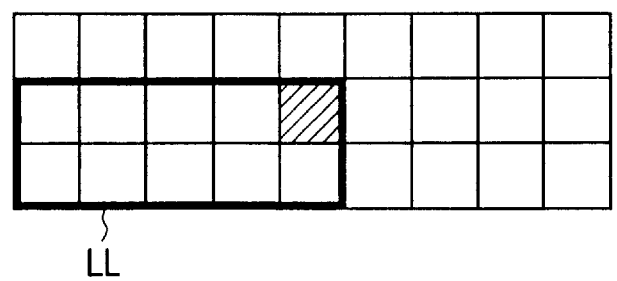
FIG. 4D
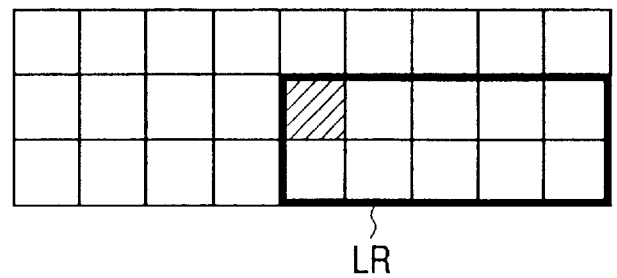
FIG. 4E

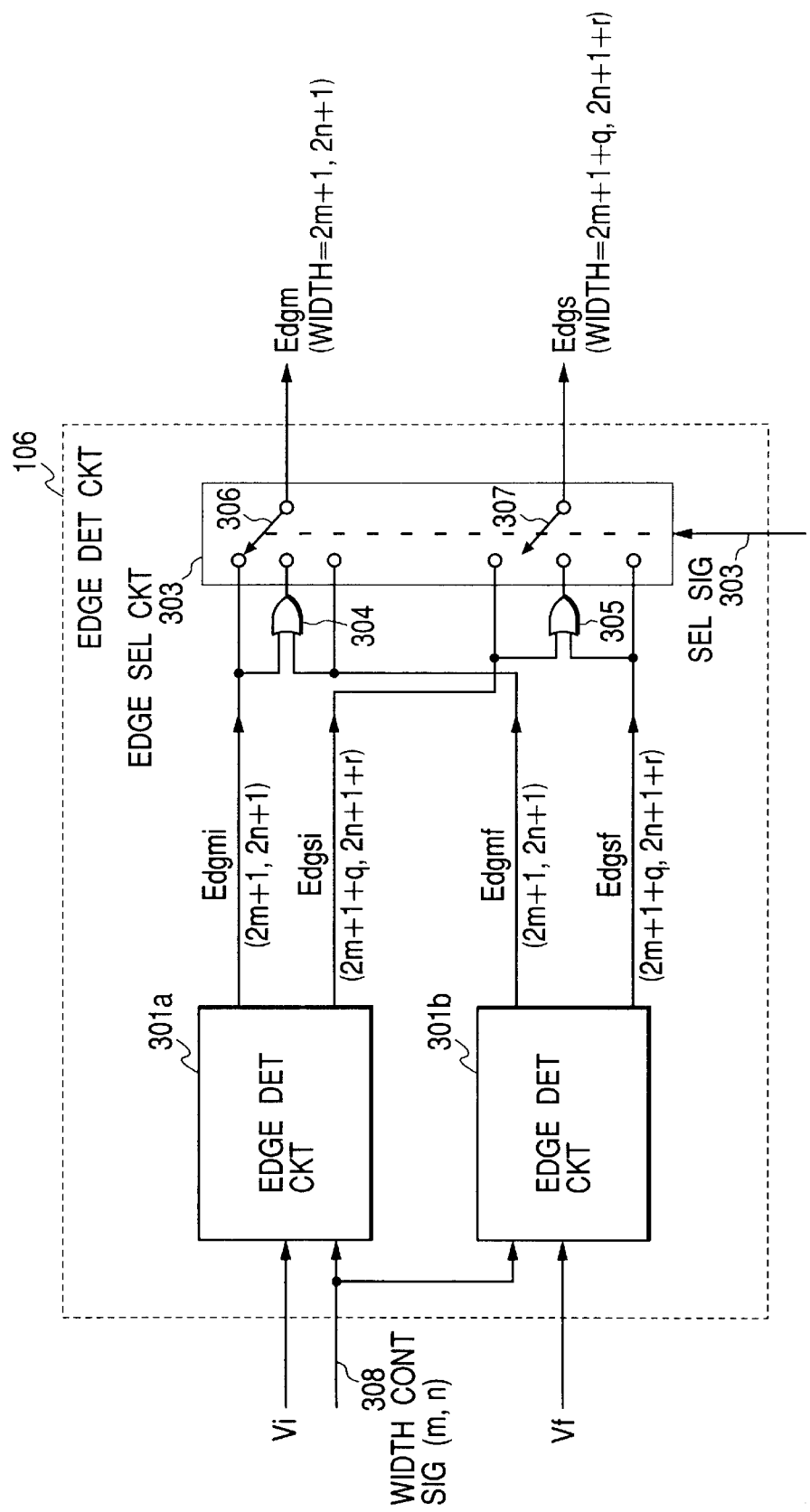

MOTION DETECTION CIRCUIT AND A NOISE SUPPRESSING CIRCUIT INCLUDING THE SAME

BACKGROUND OF THE INVENTION

1. Field of the Invention

This invention relates to a motion detection circuit for detecting motion in a video signal and a noise suppression circuit including the motion detection circuit.

2. Description of the Prior Art

A motion detection circuit for detecting motion in a video signal from a difference signal between the video signal and one-frame delayed video signal is known and a noise suppression circuit is also known. The noise suppression circuit includes the motion detection circuit, a circulation signal generation circuit for generating a circulation signal in accordance with the difference signal and the motion detection signal, and a subtractor for subtracting the circular signal from the video signal to output a noise suppressed video signal. Such a prior art motion detection circuit and a prior art noise suppression circuit are disclosed in Japanese patent application provisional publication No. 9-81754.

FIG. 9 is a block diagram of such a prior art noise suppression circuit including a prior art motion detection circuit.

The prior art motion detection circuit includes a frame memory 610 for generating a delayed video signal from the noise suppressed video signal Vo, a subtractor 602 for generating a difference signal (interframe difference signal) between the video signal Vi and the delayed video signal, a motion detection circuit 603 for detecting a motion from the video signal Vi and the delayed video signal to output a motion detection signal.

The noise suppression circuit further includes a subtractor 607 for generating the difference signal between the video signal Vi and the delayed video signal, a circulation amount determining circuit 608 for generating a circulation signal from the difference signal in accordance with the motion detection signal, and a subtractor 609 for obtaining a difference between the video signal Vi and the circulation signal to output a noise suppressed video signal Vo.

SUMMARY OF THE INVENTION

The aim of the present invention is to provide a superior motion detection circuit and a superior noise suppression circuit.

According to the present invention there is provided a first motion detection circuit including: a delay for generating a delayed video signal from a video signal, the delayed video signal being delayed by one frame from the video signal; a difference signal generation circuit for generating an interframe difference signal between the video signal and the delayed video signal; an edge detection signal generation circuit for detecting an edge from the video signal and the delayed video signal and generating an edge detection signal; and a motion judging circuit for judging a motion in the video signal at a target pixel from the interframe difference signal in accordance with the edge detection signal to output a motion detection signal.

The first motion detection circuit may further include a low-pass filter for low-pass-filtering the interframe difference signal and a selector for supplying either of an output of the low-pass filter or the interframe difference signal to the motion judging circuit as the interframe difference signal in accordance with a selection signal.

In a second motion detection circuit, the motion judging circuit mentioned in the first motion detection circuit may include a polarity deviation detecting circuit for detecting polarities of the interframe difference signal at each pixel of the video signal, detecting agreement of the polarities of all pixels at any of an upper left area of the target pixel, an upper right area of the target pixel, a lower left area of the target pixel, and a lower right area of the target pixel, and judging the motion in the interframe difference signal at the target pixel to be moving in the presence of the agreement, each of the upper left area, the upper right area, the lower left area, and the lower right area including M×N pixels of the video signal, M and N being natural numbers. In this case, the upper left area, the upper right area, the lower left area, and the lower right area include the target pixel or outside and adjacent to the target pixel.

In a third motion detection circuit, the motion judging circuit mentioned in the second motion detection circuit may further include: a peripheral pixel comparing circuit for detecting polarities of the interframe difference signal at each pixel at a predetermined area around the target pixel, detecting the number of positive polarities of the interframe difference signal at the predetermined area and the number of negative polarities of the interframe difference signal at the predetermined area, obtaining a difference in the number between the positive and negative polarities and an absolute value of the difference, comparing the absolute value with first and second different references to output a comparing result indicative of either of moving, intermediate movement, or stopping, wherein the polarity deviation detection circuit changes the comparing result from the intermediate movement to stopping in accordance with the agreement to output the motion detection signal when the comparing result is indicative of the intermediate motion and outputs the motion detection signal with the comparing result unchanged when the comparing result is indicative of the moving and stopping.

In the third motion detection circuit, the motion judging circuit may further include another polarity deviation detecting circuit for detecting polarities of the differential signal at each pixel of the video signal, detecting agreement of the polarities of all pixels at any of the upper left area, the upper right area, the lower left area, and the lower right area every the target pixel, and judging the motion in the interframe difference signal at the target pixel to be moving in the presence of the agreement and a switch for either supplying an output of the polarity deviation detecting circuit or another polarity deviation detecting circuit in accordance with a switch control signal to output the motion detection signal.

In a fourth motion detection circuit, the motion judging circuit mentioned in the second motion detection circuit may further include: a peripheral pixel comparing circuit for detecting polarities of the interframe difference signal at each pixel at a predetermined area around the target pixel, detecting the number of positive polarities of the interframe difference signal at the predetermined area and the number of negative polarities of the interframe difference signal at each pixel at the predetermined area, obtaining a difference in the number between the positive and negative polarities and an absolute value of the difference, comparing the absolute value with J−1 references to output a J-valued first result, the polarity deviation detection circuit changes the first result to stopping in accordance with the agreement when the absolute value is judged to be an intermediate value among J values to output a second result, and the motion judging circuit further comprises a majority detection circuit including a memory for detecting a majority of the Q second results of the polarity deviation detection circuit at Q pixels around the target pixels and judging the motion in the interframe difference signal at the target pixel in accordance with the detected majority with deviation to a side of stopping to output the motion detection signal.

In a fifth motion detection circuit, the edge detection signal generation circuit mentioned in the first motion detection circuit may include a first edge detection circuit for detecting an edge from the video signal, a second edge detection circuit for detecting an edge from the delayed video signal, and a third edge detection circuit for detecting an edge from the video signal and the delayed video signal, a switch responsive to a selection signal for outputting either of an output of the first, second, or third edge detection circuit as the edge detection signal.

In the fifth motion detection circuit, the edge detection signal generation circuit may be further responsive to a width control signal indicative of values of m and n and the edge detection signal generation circuit detects the edge detection signal with a horizontal width of (2m+1) pixels and with a vertical width of (2n+1) pixels, n and m being positive integers.

In the second motion detection circuit, the values of the M×N are controlled in accordance with the edge detection signal.

The fourth motion detection circuit may further include a switch responsive to the edge detection signal for either outputting the judging result of the majority detection circuit or the second result from polarity deviation detection circuit in accordance with the edge detection signal.

In the fourth motion detection circuit, the edge detection signal generation circuit includes a first edge detection circuit for detecting the edge from the video signal and the delayed video signal to generate a first edge signal (Edgm) with a first pixel width which is supplied to the polarity deviation detection circuit to control values of the M×N in accordance with the first edge signal and a second edge detection circuit for detecting the edge from the video signal and the delayed video signal to generate a second edge signal (Edgs) with a second pixel width which is supplied to the majority detection circuit, a value of the first pixel width being different from a value of the second pixel width.

According to the present invention there is also provided a noise suppression apparatus including: a motion detection circuit including: a delay for generating a delayed video signal from a video signal, the delayed video signal being delayed by one frame from the video signal; an interframe difference signal generation circuit for generating an interframe difference signal between the video signal and the delayed video signal; a low-pass filter for low-pass-filtering the interframe difference signal; a switch for outputting either of an output of the low-pass filter or the interframe difference signal in accordance with a selection signal; an edge detection signal generation circuit for detecting an edge from the video signal and the delayed video signal and generating an edge detection signal; and a motion judging circuit for judging a motion in a target pixel of the video signal from an output of the switch in accordance with the edge detection signal; a circulation signal generation circuit including: a coefficient generation circuit for generating a coefficient k, $k \leq 0 < 1$ in accordance with a judging result of the motion judging circuit; and a multiplier for multiplying the video signal by the coefficient k to output a circulation signal; and a difference signal generation circuit for generating a difference signal between the circulation signal and the video signal to output a noise suppressed video signal, wherein the motion detection circuit may be replaced with each of the motion detection circuit mentioned above.

BRIEF DESCRIPTION OF THE DRAWINGS

The object and features of the present invention will become more readily apparent from the following detailed description taken in connection with the accompanying drawings in which:

FIGS. 4A to 4E and FIGS. 5A to 5E are illustrations of this embodiment showing operations of the polarity deviation detection circuit shown in FIG. 2;

FIG. 7 is a block diagram of this embodiment showing the structure of the edge detection signal generation circuit shown in FIG. 1;

The same or corresponding elements or parts are designated with like references throughout the drawings.

DETAILED DESCRIPTION OF THE INVENTION

Hereinbelow will be described an embodiment of this invention.

Figure 1:
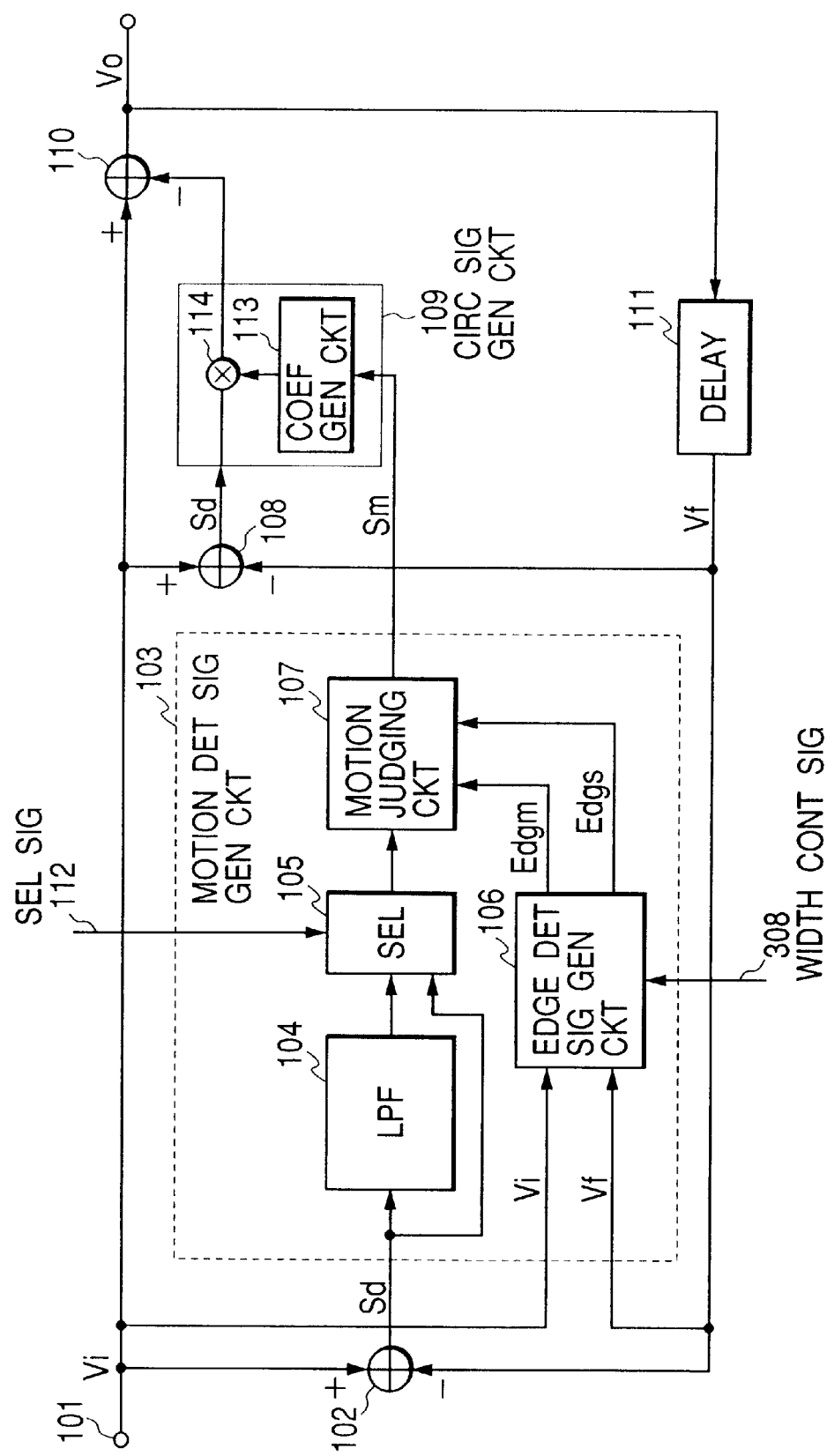
FIG. 1 is a block diagram of an embodiment of the present invention showing a structure of a motion detection circuit and a noise suppression circuit including the motion detection circuit.

FIG. 1 is a block diagram of the embodiment of the present invention showing a structure of a motion detection circuit and a noise suppression circuit including the motion detection circuit.

A motion detection circuit of the embodiment includes a delay 111 including a frame memory for generating a delayed video signal Vf from a video signal Vi, a subtractor 102 for generating a difference signal between the video signal Vi and the delayed video signal Vf as an interframe difference signal Sd, and a motion detection signal generation circuit 103 for detecting a motion in the interframe difference signal Sd at a target pixel to output a motion detection signal Sm.

The noise suppression circuit further includes a subtractor 108 for generating the interframe difference signal Sd from the video signal Vi and the delayed video signal Vf, a circulation signal generation circuit 109 for generating a circulation signal from the interframe difference signal in accordance with the motion detection signal Sm, and a subtractor 110 for obtaining a difference between the video signal Vi and the circulation signal to output a noise suppressed video signal Vo.

The circulation signal generation circuit 109 includes: a coefficient generation circuit 113 for generating a coefficient k, $k \leq 0 < 1$, in accordance with the motion detection signal Sm from the motion judging circuit 107 and a multiplier 114 for multiplying the video signal by the coefficient k.

Either of the subtractors 102 and 108 can be omitted. An input of the delay 111 is supplied with the video signal Vi instead the noise suppressed video signal Vo if only motion detection circuit is used. The delay 111 delays the video signal Vi by one frame of the video signal Vi.

The video signal Vi inputted at a video signal input terminal 101 is supplied to the subtractor 102, a subtractor 108, and to the subtractor 110. The subtractor 110 subtracts the circular signal Sm from the video signal Vi to generate the noise suppressed video signal Vo which is an output of the noise suppressing circuit. The noise suppressed video signal Vo is supplied to the delay 111 including a frame memory to delay the video signal Vi by one frame to output the delayed video signal Vf. The subtractor 102 subtracts the delayed video signal Vf from the video signal Vi to generate the interframe difference signal Sd which is supplied to the low-pass filter 104 and to the selector 105 of the motion detection signal generation circuit 103. The interframe difference signal Sd is low-pass-filtered by the low-pass filter 104. The selector 105 selects either the interframe difference signal Sd or the output of the low-pass filter 104 in accordance with the selection signal 112. That is, switching the selector 105 is effected in accordance with the frequency characteristic of the interframe difference signal Sd supplied to the motion detection signal generation circuit 103 to supply the interframe difference signal having an optimum frequency characteristic for a motion judging circuit 107 mentioned later.

The motion detection signal generation circuit 103 further includes an edge detection signal generation circuit 106 for detecting an edge from the video signal Vi and the delayed video signal Vi and generating edge detection signals Edgm and Edgs and the motion judging circuit 107 for judging a motion in the interframe difference signal at a target pixel from an output of the selector 105 in accordance with the edge detection signals Edgm and Edgs to output the motion detection signal Sm.

The edge detection signal generation circuit 106 detects an edge portion of the object from the video signal Vi and the delayed video signal Vf to generate the edge detection signal Edgm for the polarity deviation detection circuit 202 and the edge detection signal for the majority detection circuit 205. The motion judging circuit 107 judges the degree of motion at a target pixel TP and the result is supplied to the circular signal generation circuit 109.

On the other hand, the subtractor 108 generates the interframe difference signal Sd which is supplied to the circular signal generation circuit 109 which determines the coefficient K as follows:

When motion in the interframe difference signal Sd at the target pixel is judged to be moving, K=k3.

When motion in the interframe difference signal Sd at the target pixel is judged to be intermediate motion, K =k2.

When motion in the interframe difference signal Sd at the target pixel is judged to be stopping, k=k1. 0≦k3<k2<k1<1.

The interframe difference signal Sd is multiplied by the coefficient K with the multiplier 114 to generate the circular signal which is supplied to the subtractor 110. The subtractor 110 subtracts the circular signal from the video signal Vi to generate the noise suppressed video signal Vo as mentioned above.

Figure 2:
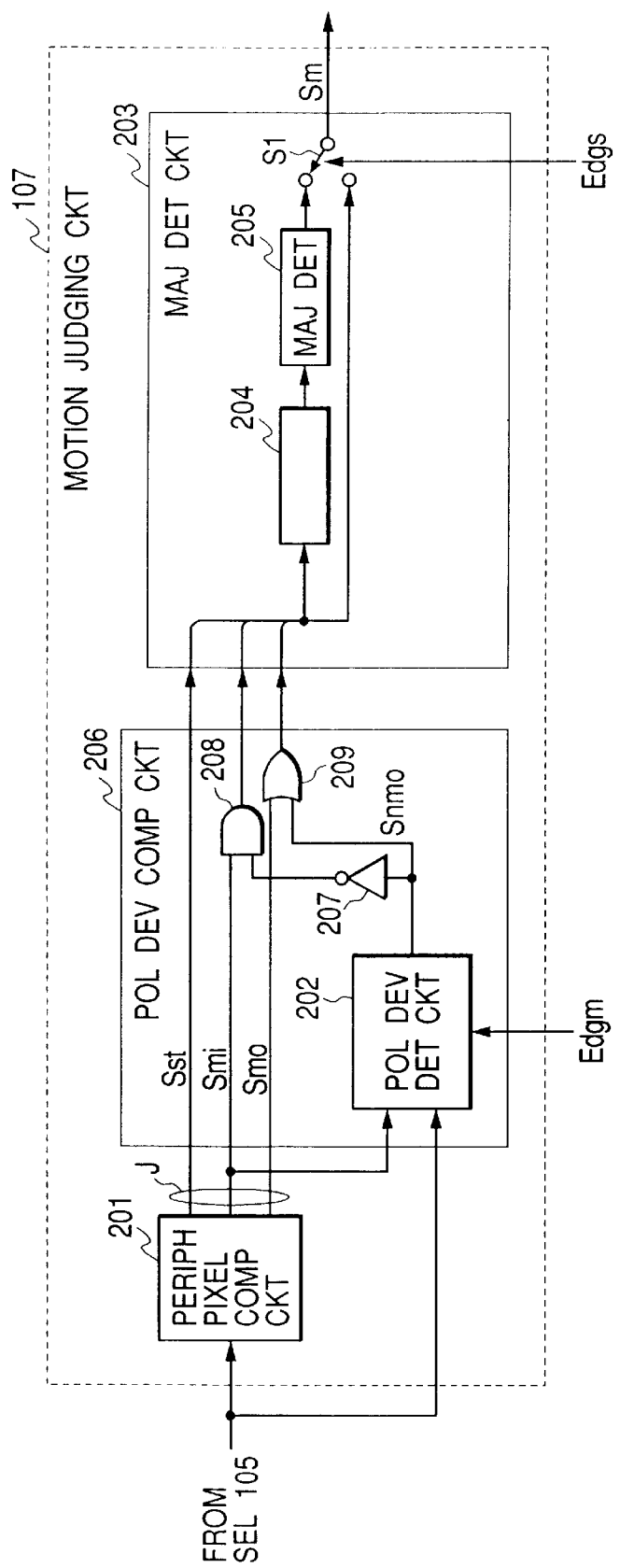
FIG. 2 is a block diagram of this embodiment showing a structure of the motion judging circuit shown in FIG. 1.

FIG. 2 is a block diagram of this embodiment showing the structure of the motion judging circuit 107 shown in FIG. 1.

The motion judging circuit 107 includes a peripheral pixel comparing circuit 201, a polarity deviation compensation circuit 206, and a majority detection circuit 203.

Figure 3:
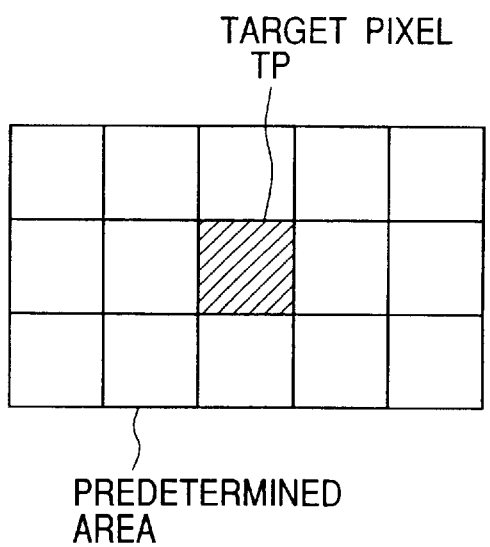
FIG. 3 is an illustration of the embodiment for illustrating an operation of the peripheral pixel comparing circuit shown in FIG. 2.

FIG. 3 is an illustration of the embodiment for illustrating an operation of the peripheral pixel comparing circuit 201.

The peripheral pixel comparing circuit 201 detects polarities of the interframe difference signal Sd at each pixel at a predetermined area around a target pixel as shown in FIG. 3, for example 5×3 including the target pixel TP, detects the number of positive polarities PP of the interframe difference signal Sd at the predetermined area and the number of negative polarities NP of the interframe difference signal at the predetermined area, obtains a difference (PP−PN) in the number between the positive and negative polarities and an absolute value of the difference |PP−PN|, compares the absolute value |PP−PN| with first and second different references (J−1 different references), i.e., TH_S and TH_M, to output a first judging result (J-valued result).

When TH_M≦|PP−NP|, the video signal at the target pixel is judged as moving (Smo).

When TH_S≦|PP−NP|<TH_M, the video signal at the target pixel is judged as intermediate moving (Smi).

When 0≦|PP−NP|<TH_S, the video signal at the target pixel is judged as stopping (Sst).

The J-valued (three-valued) first judging result is supplied to the polarity deviation detection circuit 202 which effects motion judgment again in response to the judging result of the intermediate motion. J is a natural number more than one.

FIGS. 4A to 4E and FIGS. 5A to 5E are illustrations of areas of pixels to be processed by the polarity deviation detection circuit 202. The upper left area UL shown in FIG. 4B, the upper right area UR shown in FIG. 4C, the lower left area LL shown in FIG. 4D, and the lower right area LR shown in FIG. 4E include the target pixel shown in FIG. 4A. On the other hand, the upper left area shown in FIG. 5B, the upper right area shown in FIG. 5C, the lower left area shown in FIG. 5D, and the lower right area shown in FIG. 5E outside the target pixel TP shown in FIG. 5A but adjacent to the target pixel TP.

The polarity deviation compensation circuit 206 includes polarity deviation detection circuit 202 and an inverter 207, an AND gate 208, and an OR gate 209. In response to an intermediate motion result Smi of the peripheral pixel comparing circuit 201, the polarity deviation detection circuit 202 detects polarities of the differential signal Sd at each pixel of the video signal, detects agreement of the polarities of all pixels at any of an upper left area UL of the target pixel, an upper right area UR of the target pixel, a lower left area LL of the target pixel, and a lower right area LR of the target pixel, and judges the motion in the interframe difference signal Sd at the target pixel TP as moving in the presence of the agreement.

When the peripheral pixel comparing circuit 201 judges motion at the target pixel TP as intermediate motion (Smi), the polarity deviation compensates the first Judging result of the peripheral pixel comparing circuit 201 from the intermediate motion (Smi) with the inverter 207 and the AND gate,208. On the other hand, the OR gate 209 does not compensate the Judging result of the peripheral pixel comparing circuit 201 in accordance with the result of the polarity deviation detection circuit 202.

More specifically, when the peripheral pixel comparing circuit 201 Judges the motion as intermediate motion and the polarity deviation detection circuit Judges the motion to be moving, the peripheral deviation detection circuit 202 outputs L logic level at a signal Sst, H logic level at a signal Smi (an output of the AND gate 208), and L logic level at a signal Smo (an output of the OR gate 209). In response to the signal Smi, the polarity deviation detection circuit 202 Judges the motion and if the second Judging result is stopping, the polarity deviation detection circuit 202 outputs H logic level. Then, the inverter 207 outputs L logic level, so that the H logic level at an output of the AND gate 208 is changed to L logic level. On the other hand, L logic level at an output of the OR gate 209 is unchanged.

If the second Judging result of the polarity deviation detection circuit 202 is not moving, the polarity deviation detection circuit 202 outputs L logic level, so that the AND gate 208 remains H logic level and the output of the OR gate 209 remains L logic level. As mentioned, the motion judgement is effected again, so that a more accurate judgement is provided.

Moreover, the second judging result is supplied to the majority detecting circuit 203 to provide further motion judgement to provide still further accurate motion judgement.

Figure 6:
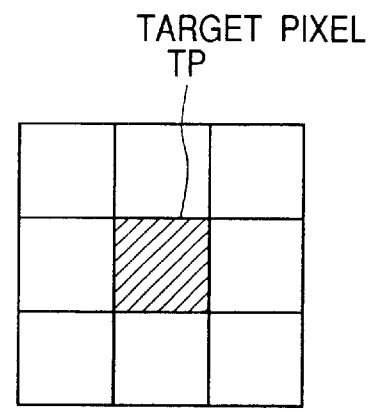
FIG. 6 is an illustration of this embodiment showing an operation of the majority detection circuit shown in FIG. 2.
Figure 5A:
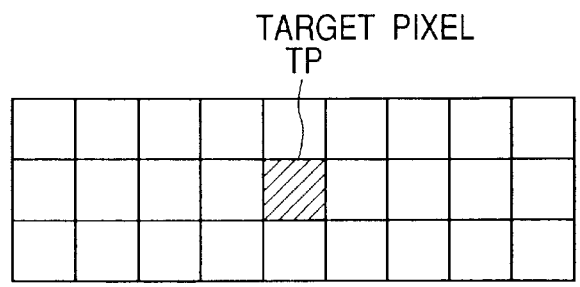
Figure 5B:
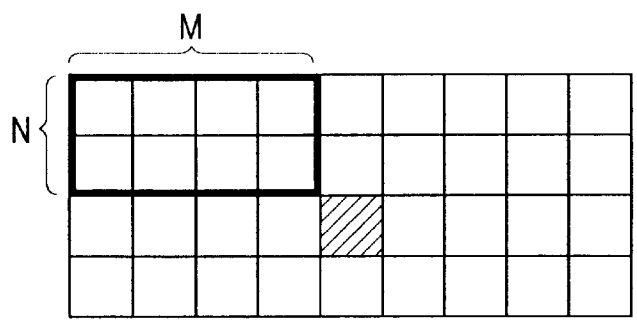
Figure 5C:
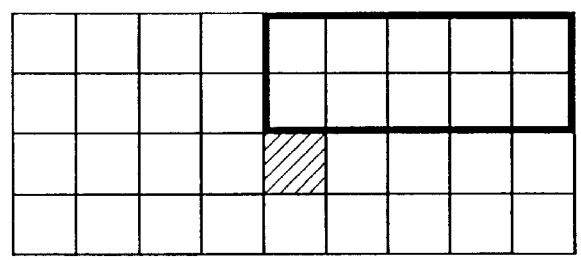
Figure 5D:
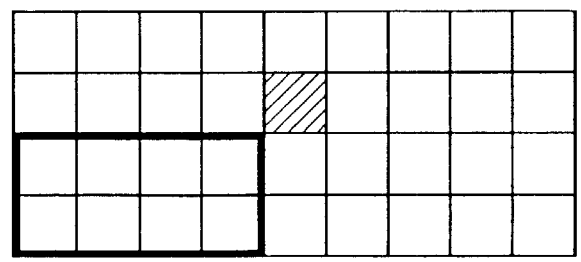
Figure 5E:
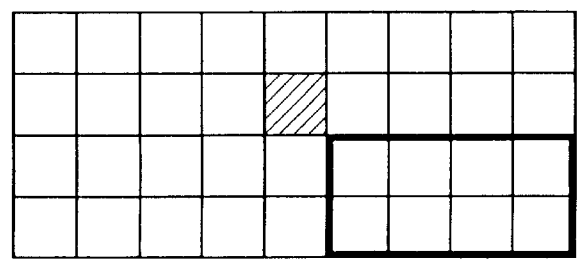

FIG. 6 is an illustration of this embodiment showing an operation of the majority detection circuit 203.

The majority detection circuit 203 includes a memory 204 for storing the second judging results of the polarity deviation compensation circuit 206 and reads and outputs the second judging result at a predetermined peripheral area including Q pixels as shown in FIG. 6, for example, eight pixels around the target pixel TP, a majority detector 205, and a switch S1. The majority detector 205 detects a majority of the Q results of the polarity deviation compensation circuit 206 at Q pixels around the target pixels. The switch S1 outputs either of the result of the majority detector 205 or the second judging result of the polarity deviation compensation circuit 206 in accordance with the edge detection signal Edgs to output the motion detection signal Sm.

The majority detector 205 detects majority of eight second judging results and if more than R1 pixels show the same judging result, the majority detector 205 detects the majority as the third judging result to equalize the motion judgment at the target pixel TP to the judging results at adjacent pixels around the target pixel TP to avoid an isolated judging result. More specifically, if the motion at four pixels out of the eight adjacent pixels are judged to be moving and motion at another four adjacent pixels are judged to be intermediate motion, the third judging result is made to be the intermediate motion. If the motion at four adjacent pixels is judged to be intermediate motion and motion at another four pixels is judged to be stopping, the third judging result of the target pixel is judged as stopping to provide the third judging result which is weighted to the side of stopping. That is, the intermediate motion judged by the peripheral pixel comparing circuit 201 and moving judged by the polarity deviation detection circuit 202 are judged again to stopping, so that noise at the image which is stopping is reduced.

The switch Si either outputs the second judging result at the target pixel TP from the polarity deviation compensation circuit 206 or the third judging result from the majority detector 205 in accordance with the edge detection signal Edgs.

FIG. 7 is a block diagram of this embodiment showing the structure of the edge detection signal generation circuit 106 shown in FIG. 1.

The edge detection signal generation circuit 106 includes a first edge detection circuit 301*a*, a second edge detection circuit 301*b*, an OR gate 304, an OR gate 305, and an edge selection circuit 302. The first edge detection circuit 301*a* detects an edge from the video signal Vi with width horizontally arranged (2m+1) pixels (the target pixel and m right pixels and m left pixels) and vertically arranged (2n+1) pixels (the target pixel and n upper pixels and n lower pixels) to generate the edge detection signal Edgmi and detects an edge from the video signal Vi with width horizontally arranged (2m+1)+q pixels and vertically arranged (2n+1)+r pixels to generate the edge detection signal Edgsi in accordance with the width control signal 308. The second edge detection circuit 301*b* detects an edge from the video signal Vf with width horizontally arranged (2m+1) pixels and vertically arranged (2n+1) pixels to generate the edge detection signal Edgmf and detects an edge from the video signal Vf with width horizontally arranged (2m+1)+q pixels and vertically arranged (2n+1)+r pixels to generate the edge detection signal Edgsf in accordance with the width control signal 308.

The OR gate 304 generates an edge detection signal which is intermediate between the edge detection signals Edgmi and Edgmf. The OR gate 305 generates an edge detection signal which is intermediate between the edge detection signals Edgsi and Edgsf. The edge selection circuit 302 outputs either the edge detection signal Edgmi, the edge detection signal Edgmf, or the output of the OR gate 304 as the edge detection signal Edgm and outputs either the edge detection signal Edgsi, the edge detection signal Edgsf, or the output of the OR gate 305 as the edge detection signal Edgs in accordance with the selection signal 303.

The edge detection signals Edgm and Edgs represent an edge with H logic level (1) and a flat portion with L logic level (0).

The polarity detection circuit 202 controls the size (M, N) of the upper left area UL, the upper right area UR, the lower left area LL, and the lower right area LR in accordance with the edge detection signal Edgm. More specifically, when the edge detection signal is H (1), the number of the pixels (M, N) at the area is reduced, for example 3×2 pixels and if the edge detection signal is L (0), the number of pixels (M×N) is made large, for example 5×2 pixels, so that generation of after image is suppressed and noise at stopping areas is reduced.

Similarly, the edge detection signal Edgs for the majority detection circuit 204 enables or disables the majority detector 205. More specifically, when the edge detection signal Edgs for the majority detection circuit 204 is H (1), the switch S1 outputs the second judging result from the polarity deviation compensation circuit 206 or third judging result from the majority detection 205, so that it is prevented that the final judging result at the target pixel showing an edge is judged toward the stopping side again. More specifically, the switch S1 either outputs the second judging result at the target pixel TP from the polarity deviation compensation circuit 206 or the third judging result from the majority detector 205 in accordance with the edge detection signal Edgs.

As mentioned, the motion detection is effected more accurately, so that after image by movement of image is suppressed and the noise at stopping portions are suppressed.

Figure 8:
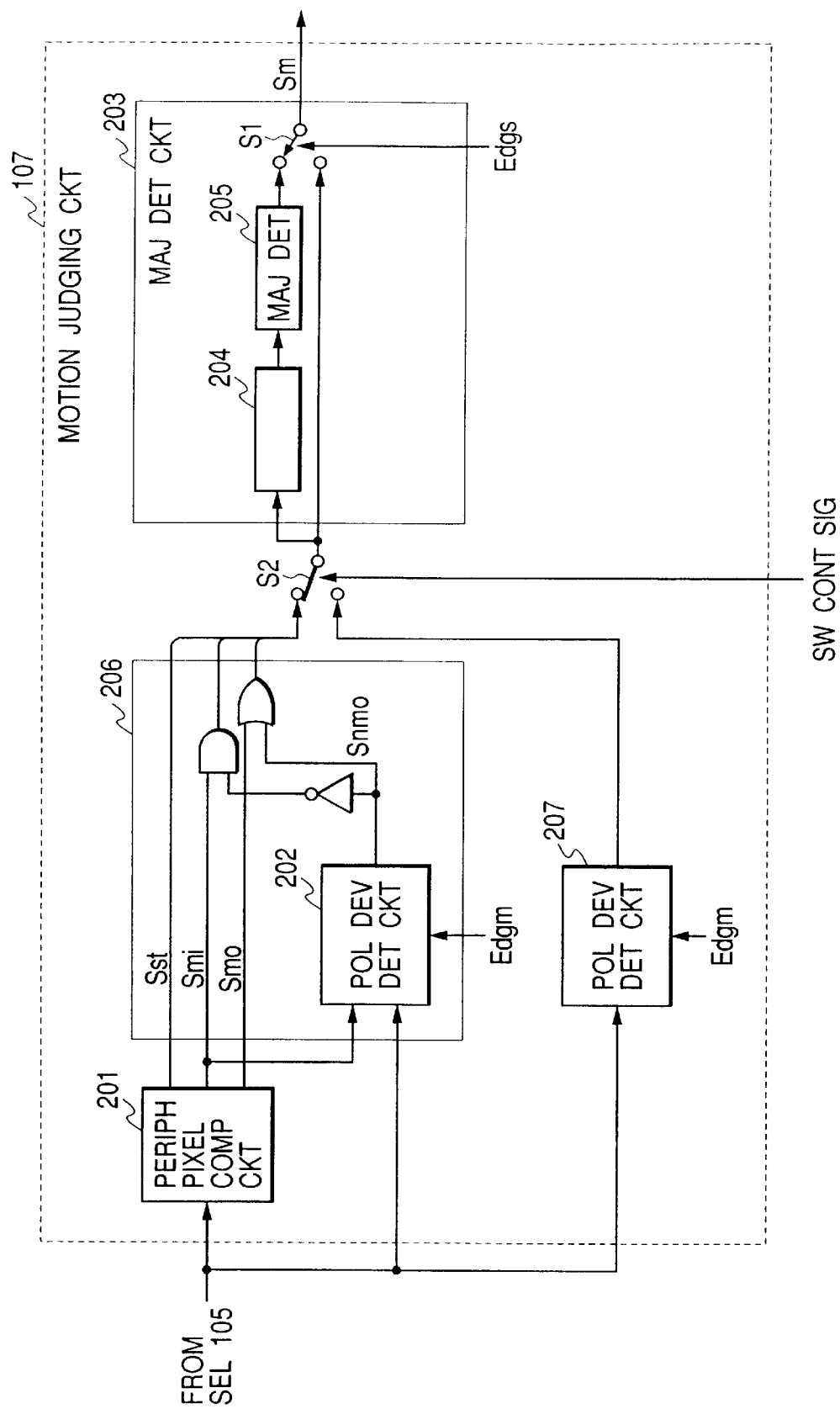
FIG. 8 is a block diagram of a modification of the invention.
Figure 9:
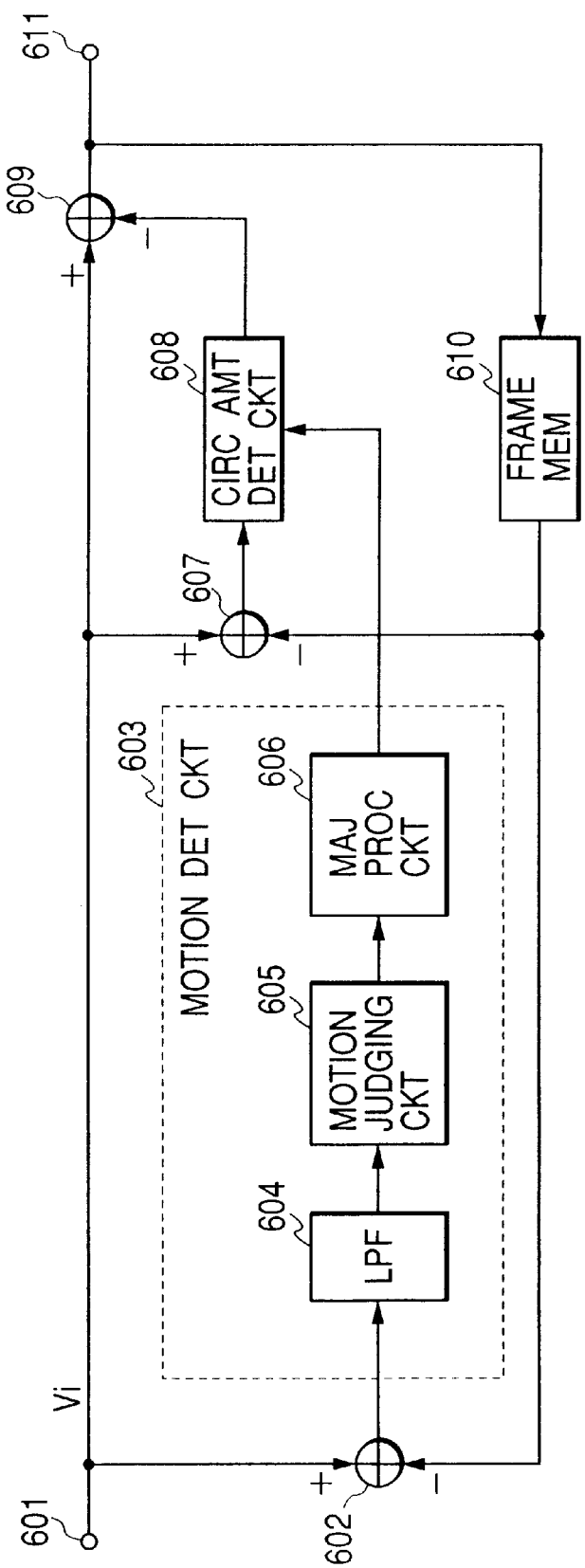
FIG. 9 is a block diagram of a prior art noise suppression circuit including a prior art motion detection circuit.

FIG. 8 is a block diagram of a modification of the invention.

The modification shown in FIG. 8 is substantially the same as the embodiment shown in FIG. 1. The difference is that another polarity deviation detection circuit 207 and a switch S2 are further provided. The switch S2 outputs either of the second judging result from the polarity deviation compensation circuit 206 or the judging result form the polarity deviation detection circuit 207 in accordance with a switching control signal. The polarity deviation compensation circuit 206 compensates when the first judging result is intermediate motion by the peripheral pixel comparing circuit 201. On the other hand, the polarity deviation detection circuit 207 detects agreement of the polarities of all pixels at any of an upper left area UL of the target pixel, an upper right area UR of the target pixel, a lower left area LL of the target pixel, and a lower right area LR of the target pixel every target pixel TP, and judges the motion in the interframe difference signal Sd at the target pixel TP as moving in the presence of the agreement. The switch S2 supplies the judging result by the polarity deviation detection circuit 207 when the switching control signal indicates the side of the polarity deviation detection circuit 207.

What is claimed is:

1. A motion detection circuit comprising:

delay means for generating a delayed video signal from a video signal, said delayed video signal being delayed by one frame from said video signal:

interframe difference signal generation means for generating an interframe difference signal between said video signal and said delayed video signal;

edge detection signal generation means for detecting an edge from said video signal and said delayed video signal and generating an edge detection signal, said edge detection signal generation means including a selector for selecting and outputting either of said edge from said video signal or said edge from said delayed video signal in accordance with a selection signal; and motion judging means for Judging a motion in said video signal at a target pixel from said interframe difference signal in accordance with said edge detection signal to output a motion detection signal.

2. A motion detection circuit as claimed in claim 1, further comprising:

a low-pass filter for low-pass-filtering said interframe difference signal; and a selector for supplying either of an output of said low-pass filter or said interframe difference signal to said motion judging means as said interframe difference signal in accordance with a selection signal.

3. A motion detection circuit as claimed in claim 1, wherein said motion judging means includes polarity deviation detecting means for detecting polarities of said interframe difference signal at each pixel of said video signal, detecting agreement of said polarities of all pixels at any of an upper left area of said target pixel, an upper right area of said target pixel, a lower left area of said target pixel, and a lower right area of said target pixel, and judging motion in said interframe difference signal at said target pixel to be moving in the presence of said agreement, each of said upper left area, said upper right area, said lower left area, and said lower right area respectively including M×N pixels of said video signal, M and N being natural numbers.

4. A motion detection circuit as claimed in claim 3, wherein said upper left area, said upper right area, said lower left area, and said lower right area include said target pixel.

5. A motion detection circuit as claimed in claim 3, wherein said upper left area, said upper right area, said lower left area, and said lower right area are outside and adjacent to said target pixel.

6. A motion detection circuit as claimed in claim 3, wherein said motion Judging means further includes:

peripheral pixel comparing means for detecting polarities of said interframe difference signal at each pixel at a predetermined area around said target pixel, detecting the number of positive polarities of said interframe difference signal at said predetermined area and the number of negative polarities of said interframe difference signal at each pixel at said predetermined area, obtaining a difference in the number between said said positive and negative polarities and an absolute value of said difference, comparing said absolute value with first and second different references to output a comparing result indicative of either of moving, intermediate movement, or stopping, wherein said polarity deviation detection means changes said comparing result from said intermediate movement to said stopping in accordance with said agreement to output said motion detection signal when said comparing result is indicative of said intermediate motion and outputs said motion detection signal with said comparing result unchanged when said comparing result is indicative of said moving and stopping.

7. A motion detection circuit as claimed in claim 6, wherein said motion judging means further includes another polarity deviation detecting means for detecting polarities of said differential signal at each pixel of said video signal, detecting agreement of said polarities of all pixels at any of said upper left area, said upper right area, said lower left area, and said lower right area every said target pixel, and Judging motion in said interframe difference signal at said target pixel to be moving in the presence of said agreement and a switch for either supplying an output of said polarity deviation detecting means or said another polarity deviation detecting means in accordance with a switch control signal to output said motion detection signal.

8. A motion detection circuit as claimed in claim 3, wherein said motion Judging means further includes:

peripheral pixel comparing means for detecting polarities of said interframe difference signal at each pixel at a predetermined area around said target pixel, detecting the number of positive polarities of said interframe difference signal at said predetermined area and the number of negative polarities of said interframe difference signal at each pixel at said predetermined area, obtaining a difference in the number between said said positive and negative polarities and an absolute value of said difference, comparing said absolute value with J−1 references to output a J-valued first result, said polarity deviation detection means changes said first result to stopping in accordance with said agreement when said difference is judged to be an intermediate value among J values to output a second result, and said motion judging means further comprises majority detection means including a memory for detecting a majority of Q said second results of said polarity deviation detection means at Q pixels around said target pixels and judging said motion in said interframe difference signal at said target pixel in accordance with said detected majority with deviation to a side of stopping to output said motion detection signal, J being a natural number more than one, Q being a natural number more than one.

9. A motion detection circuit as claimed in claim 1, wherein said edge detection signal generation means comprises a first edge detection circuit for detecting an edge from said video signal, a second edge detection circuit for detecting an edge from said delayed video signal, a third edge detection circuit for detecting an edge from said video signal and said delayed video signal, and a switch responsive to a selection signal for outputting either of an output of said first, second, or third edge detection circuit as said edge detection signal.

10. A motion detection circuit as claimed in claim 9, wherein said edge detection signal generation means is further responsive to a width control signal indicative of values of m and n and said edge detection signal generation means detects said edge detection signal with a horizontal width of (2m+1) pixels and with a vertical width of (2n+1) pixels, said n and m are positive integers.

11. A motion detection circuit as claimed in claim 3, 10 wherein values of said M and N are controlled in accordance with said edge detection signal.

12. A motion detection circuit as claimed in claim 8, further comprising a switch responsive to said edge detection signal for either outputting said judging result of said majority detection means or said second comparing result in accordance with said edge detection signal.

13. A motion detection circuit as claimed in claim 8, wherein said edge detection signal generation means includes a first edge detection circuit for detecting said edge from said video signal and said delayed video signal to generate a first edge signal (Edgm) with a first pixel width which is supplied to said polarity deviation detection means to control values of said M×N in accordance with said first edge signal and a second edge detection circuit for detecting said edge from said video signal and said delayed video signal to generate a second edge signal (Edgs) with a second pixel width which is supplied to said majority detection means, a value of said first pixel width being different from a value of said second pixel width.

14. A noise suppression apparatus comprising:
   a motion detection means including:
   delay means for generating a delayed video signal from a video signal, said delayed video signal being delayed by one frame from said video signal;
   interframe difference signal generation means for generating an interframe difference signal between said video signal and said delayed video signal;
   a low-pass filter for low-pass-filtering said interframe difference signal;
   a switch for outputting either of an output of said low-pass filter or said interframe difference signal in accordance with a selection signal;
   edge detection signal generation means for detecting an edge from said video signal and said delayed video signal and generating an edge detection signal; and
   motion judging means for judging a motion in a target pixel of said video signal from an output of said switch in accordance with said edge detection signal;
   circulation signal generation means including:
      coefficient generation means for generating a coefficient k, k≦0<1 In accordance with a judging result of said motion judging means; and
      multiplier for multiplying said video signal by said coefficient k to output a circulation signal; and
      difference signal generation means for generating a difference signal between said circulation signal and said video signal to output a noise suppressed video signal.

15. A noise suppression apparatus as claimed in claim 14, wherein said coefficient k when said motion judging means judges said motion to be stopping is greater than said coefficient k when said motion judging means judges said motion to be moving.

16. A noise suppression apparatus as claimed in claim 14, further comprising:
   a low-pass filter for low-pass-filtering said interframe difference signal; and
   a selector for supplying either of an output of said low-pass filter or said interframe difference signal to said motion judging means as said interframe difference signal in accordance with a selection signal.

17. A noise suppression apparatus as claimed in claim 14, wherein said motion judging means includes polarity deviation detecting means for detecting polarities of said interframe difference signal at each pixel of said video signal, detecting agreement of said polarities of all pixels at any of an upper left area of said target pixel, an upper right area of said target pixel, a lower left area of said target pixel, and a lower right area of said target pixel, and Judging motion in said interframe difference signal at said target pixel to be moving in the presence of said agreement, each of said upper left area, said upper right area, said lower left area, and said lower right area including M×N pixels of said video signal, M and N being natural numbers.

18. A noise suppression apparatus as claimed in claim 17, wherein said upper left area, said upper right area, said lower left area, and said lower right area include said target pixel.

19. A noise suppression apparatus as claimed in claim 17, wherein said upper left area, said upper right area, said lower left area, and said lower right area are outside and adjacent to said target pixel.

20. A noise suppression apparatus as claimed in claim 17, wherein said motion Judging means further includes: peripheral pixel comparing means for detecting polarities of said interframe difference signal at each pixel at a predetermined area around said target pixel, detecting the number of positive polarities of said interframe difference signal at said predetermined area and the number of negative polarities of said interframe difference signal at each pixel at said predetermined area, obtaining a difference in the number between said positive and negative polarities and an absolute value of said difference, comparing said absolute value with first and second different references to output a comparing result indicative of either of moving, intermediate movement, or stopping, wherein said polarity deviation detection means changes said comparing result from said intermediate movement to said stopping in accordance with said agreement to output said motion detection signal when said comparing result is indicative of said intermediate motion and outputs said motion detection signal with said comparing result unchanged when said comparing result is indicative of said moving and stopping.

21. A noise suppression apparatus as claimed in claim 20, wherein said motion judging means further includes another polarity deviation detecting means for detecting polarities of said differential signal at each pixel of said video signal, detecting agreement of said polarities of all pixels at any of said upper left area, said upper right area, said lower left area, and said lower right area every said target pixel, and judging motion in said interframe difference signal at said target pixel to be moving in the presence of said agreement and a switch for either supplying an output of said polarity deviation detecting means or said another polarity deviation detecting means in accordance with a switch control signal to output said motion detection signal.

22. A noise suppression apparatus as claimed in claim 17, wherein said motion judging means further includes: peripheral pixel comparing means for detecting polarities of said interframe difference signal at each pixel at a predetermined area around said target pixel, detecting the number of positive polarities of said interframe difference signal at each pixel at said predetermined area and the number of negative polarities of said interframe difference signal at each pixel at said predetermined area, obtaining a difference in the number between said said positive and negative polarities and an absolute value of said difference, comparing said absolute value with J−1 references to output a J-valued first comparing result, said polarity deviation detection means changes said first comparing result to stopping in accordance with said agreement when said difference is judged to be an intermediate value among J values to output a second result, and said motion judging means further comprises majority detection means including a memory for detecting a majority of said Q results of said polarity deviation detection means at Q pixels around said target pixels and judging said motion of said target pixel in accordance with said detected majority with deviation to a side of stopping to output said motion detection signal, J and Q being natural numbers more than one.

23. A noise suppression apparatus as claimed in claim 14, wherein said edge detection signal generation means comprises a first edge detection circuit for detecting an edge from said video signal, a second edge detection circuit for detecting an edge from said delayed video signal, a third edge detection circuit for detecting an edge from said video signal and said delayed video signal, and a switch responsive to a selection signal for outputting either of an output of said first, second, or third edge detection circuit as said edge detection signal.

24. A noise suppression apparatus as claimed in claim 23, wherein said edge detection signal generation means is further responsive to a width control signal indicative of values of m and n and said edge detection signal generation means detects said edge detection signal with a horizontal width of (2m+1) pixels and with a vertical width of (2n+1) pixels, said n and m are positive integers.

25. A noise suppression apparatus as claimed in claim 17, wherein values of said M×N are controlled in accordance with said edge detection signal.

26. A noise suppression apparatus as claimed in claim 22, further comprising a switch responsive to said edge detection signal for either outputting said judging result of said majority detection means or said second comparing result in accordance with said edge detection signal.

27. A noise suppression apparatus as claimed in claim 22, wherein said edge detection signal generation means includes a first edge detection circuit for detecting said edge from said video signal and said delayed video signal to generate a first edge signal (Edgm) with a first pixel width which is supplied to said polarity deviation detection means to control values of said M×N in accordance with said first edge signal and a second edge detection circuit for detecting said edge from said video signal and said delayed video signal to generate a second edge signal (Edgs) with a second pixel width which is supplied to said majority detection means, a value of said first pixel width being different from a value of said second pixel width.

28. A motion detection circuit comprising:
delay means for generating a delayed video signal from a video signal, said delayed video signal being delayed by one frame from said video signal: interframe difference signal generation means for generating an interframe difference signal between said video signal and said delayed video signal;
edge detection signal generation means for detecting an edge from said video signal and said delayed video signal and generating an edge detection signal;

motion judging means for Judging a motion in said video signal at a target pixel from said interframe difference signal in accordance with said edge detection signal to output a motion detection signal;
a low-pass filter for low-pass-filtering said interframe difference signal; and a selector for supplying either of an output of said low-pass filter or said interframe difference signal to said motion judging means as said interframe difference signal in accordance with a selection signal.

29. A motion detection circuit comprising:
delay means for generating a delayed video signal from a video signal, said delayed video signal being delayed by one frame from said video signal:
interframe difference signal generation means for generating an interframe difference signal between said video signal and said delayed video signal;
edge detection signal generation means for detecting an edge from said video signal and said delayed video signal and generating an edge detection signal; and
motion judging means for Judging a motion in said video signal at a target pixel from said interframe difference signal in accordance with said edge detection signal to output a motion detection signal, said motion judging means including polarity deviation detecting means for detecting polarities of said interframe difference signal at each pixel of said video signal, detecting agreement of said polarities of all pixels at any of an upper left area of said target pixel, an upper right area of said target pixel, a lower left area of said target pixel, and a lower right area of said target pixel, and judging motion in said interframe difference signal at said target pixel to be moving in the presence of said agreement, each of said upper left area, said upper right area, said lower left area, and said lower right area respectively including M×N pixels of said video signal, M and N being natural numbers.

30. A motion detection circuit as claimed in claim 29, wherein said upper left area, said upper right area, said lower left area, and said lower right area include said target pixel.

31. A motion detection circuit as claimed in claim 29, wherein said upper left area, said upper right area, said lower left area, and said lower right area are outside and adjacent to said target pixel.

32. A motion detection circuit as claimed in claim 29, wherein said motion judging means further includes: peripheral pixel comparing means for detecting polarities of said interframe difference signal at each pixel at a predetermined area around said target pixel, detecting the number of positive polarities of said interframe difference signal at said predetermined area and the number of negative polarities of said interframe difference signal at each pixel at said predetermined area, obtaining a difference in the number between said positive and negative polarities and an absolute value of said difference, comparing said absolute value with first and second different references to output a comparing result indicative of either of moving, intermediate movement, or stopping, wherein said polarity deviation detection means changes said comparing result from said intermediate movement to said stopping in accordance with said agreement to output said motion detection signal when said comparing result is indicative of said intermediate motion and outputs said motion detection signal with said comparing result unchanged when said comparing result is indicative of said moving and stopping.

33. A motion detection circuit comprising:

delay means for generating a delayed video signal from a video signal, said delayed video signal being delayed by one frame from said video signal:

interframe difference signal generation means for generating an interframe difference signal between said video signal and said delayed video signal;

edge detection signal generation means for detecting an edge from said video signal and said delayed video signal and generating an edge detection signal, said edge detection signal generation means including a first edge detection circuit for detecting an edge from said video signal, a second edge detection circuit for detecting an edge from said delayed video signal, a third edge detection circuit for detecting an edge from said video signal and said delayed video signal, and a switch responsive to a selection signal for outputting any of an output of said first, second, or third edge detection circuit as said edge detection signal; and motion judging means for Judging a motion in said video signal at a target pixel from said interframe difference signal in accordance with said edge detection signal to output a motion detection signal;

34. A motion detection circuit as claimed in claim 33, wherein said edge detection signal generation means is further responsive to a width control signal indicative of values of m and n and said edge detection signal generation means detects said edge detection signal with a horizontal width of (2m+1) pixels and with a vertical width of (2n+1) pixels, said n and m are positive integers.

35. A motion detection circuit as claimed in claim 29, wherein values of said M and N are controlled in accordance with said edge detection signal.

* * * * *

UNITED STATES PATENT AND TRADEMARK OFFICE
CERTIFICATE OF CORRECTION

PATENT NO. : 6,687,300 B1
DATED : February 3, 2004
INVENTOR(S) : Yukio Fujita, Noriyoshi Kato and Misa Kasahara It is certified that error appears in the above-identified patent and that said Letters Patent is hereby corrected as shown below:

Title page,
Item [73], Assignee, change "Matsushita Electic Industrial Co., Inc." to
-- Matsushita Electric Industrial Co., Ltd. --.

Column 9,
Lines 31 and 65, change "Judging" to -- judging --;

Column 10,
Lines 27 and 34, change "Judging" to -- judging --;
Line 42, delete the second "said";

Column 11,
Line 10, delete "10";
Line 55, change "In" to -- in --;

Column 16,
Line 6, change ";" to -- . --.

Signed and Sealed this

Third Day of January, 2006

JON W. DUDAS
*Director of the United States Patent and Trademark Office*